United States Patent [19]

Valletti

[11] Patent Number: 4,489,613
[45] Date of Patent: Dec. 25, 1984

[54] TRANSMITTING DEVICE FOR MEASURING THE OPERATING PRESSURE IN A SYSTEM

[76] Inventor: Ennio Valletti, Via Rosso Medardo, 16, 20159 - Milano, Italy

[21] Appl. No.: 460,947

[22] Filed: Jan. 25, 1983

[30] Foreign Application Priority Data

Feb. 10, 1982 [IT] Italy ............................... 19559 A/82

[51] Int. Cl.³ ................................................ G01L 7/08
[52] U.S. Cl. ......................................... 73/701; 73/730
[58] Field of Search ............... 73/715, 730, 701, 119 A

[56] References Cited

U.S. PATENT DOCUMENTS 2,812,662 11/1957 Coberly ............................ 73/715 X

FOREIGN PATENT DOCUMENTS 0817035 7/1969 Canada .................................. 73/715

Primary Examiner—Donald O. Woodiel
Attorney, Agent, or Firm—Bucknam and Archer

[57] ABSTRACT

A device for sensing and monitoring the pressure variations of a pressurized fluid in a duct (13), comprises an upper body (1) coupled to a pressurized air source (5) and a lower body (2) which is coupled by means of a resilient ring, to a sleeve (12) welded to the duct (13) in which the pressure is to be monitored. A graduated scale duct (18), associated with the upper body and communicating with a needle valve (16) affords the possibility of visually monitoring the adjusted air amount. A coupling duct (19) communicates with a joining duct (20), to which a pressure detecting instrument (22) is applied and leads to an interspace (23) defined between the lower and upper bodies and communicates in turn with the inner side of a diaphragm (26) which, on the opposite side, contacts the pressurized fluid.

4 Claims, 3 Drawing Figures

TRANSMITTING DEVICE FOR MEASURING THE OPERATING PRESSURE IN A SYSTEM

BACKGROUND OF THE INVENTION

The present invention relates to a transmitter device structure, for measuring the operating pressure in a system.

Devices are presently known for measuring the operating pressure in a system which consist of a member, located in a duct in which the pressure therein is to be measured, provided with a diaphragm membrane which is in contact with the pressurized fluid.

On the other side of said membrane there acts a pressurized air flow, generated by an air pump, which allows for, based on the opposite force equilibrium principle, the operating pressure of the system to be precisely measured, by simply using a pressure gauge or other like detecting instrument.

On the other hand the known devices of the above mentioned type are generally structurally very cumbersome and moreover they are not completely reliable.

SUMMARY OF THE INVENTION

Accordingly the object of the present invention is to overcome the mentioned drawbacks by providing a transmitter device for measuring the operating pressure in a system which is structurally very simple and very reliable in operation.

It is a primary object of the present invention to provide such a transmitter device which, owing to its particular mechanical design, is effective to allow for the possibility of easily controlling or monitoring the component members thereof, in order to repair the latter without the necessity of halting the system thereon said device is applied.

Yet another object of the present invention is to provide such a transmitter device which is of very safe use.

According to one aspect of the present invention the thereinabove mentioned task and objects, as well as yet other objects which will become more apparent hereinafter are achieved by a transmitter device for measuring the operating pressure in a system, characterized in that it comprises an upper body and a lower body, tightly coupled to one another by means of locking screws, said lower body being tightly associated, by a resilient ring member, with a sleeve member welded on a duct of said system the pressure thereof is to be measured.

BRIEF DESCRIPTION OF THE DRAWINGS

Further characteristics and advantages of the invention will become more apparent hereinafter from the following detailed description of a preferred though not exclusive embodiment thereof, being illustrated by way of an indicative but not limitative example in the accompanying drawings, where.

DESCRIPTION OF THE PREFERRED EMBODIMENT

Figure 1:
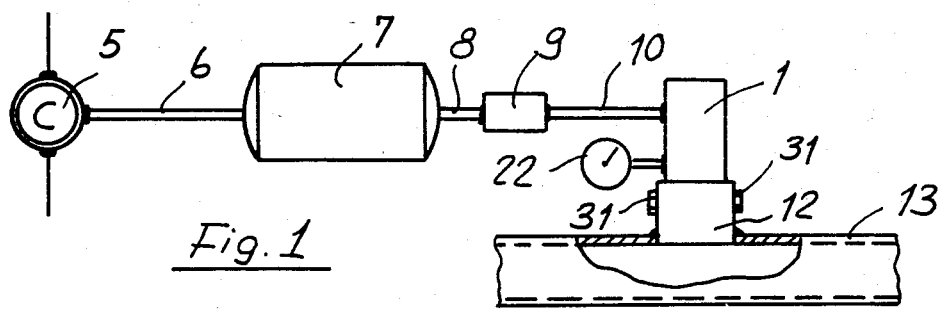
FIG. 1 illustrates a schematic view of the measuring circuit and device, as coupled to a system duct or pipe containing the process fluid.
Figure 2:
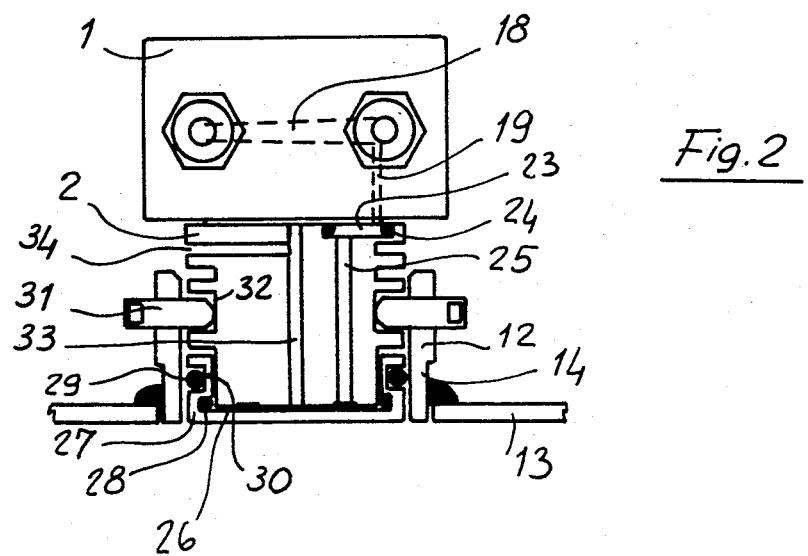
FIG. 2 illustrates a longitudinal cross-section view of the measuring device according to the present invention.
Figure 3:
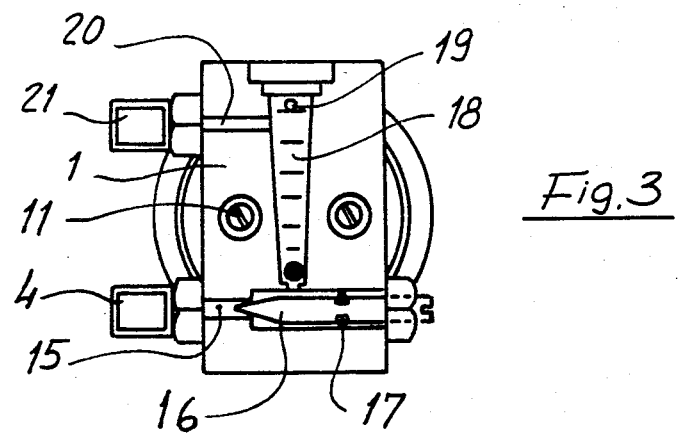
FIG. 3 illustrates a top view of the device according to the present invention.

With reference to the numerals of the mentioned figures, the device according to the present invention comprises essentially an upper body 1, which is associated, as it will be described in a more detailed way thereinafter, to a lower body 2. The mentioned upper body 1 is coupled, through a threaded coupling member 4, with a pressurized air source, produced by a generator 5.

The latter communicates, through a duct 6, with a vessel or tank 7 which is in turn coupled, through a further duct 8, with a reducing unit 9. At the output of the pressure reducing unit 9 there is provided a union 10 which, through the mentioned threaded coupling member 4, lead to said upper body 1.

Said upper body 1 is coupled, through a locking screw pair 11, to the lower body 2, which latter is coupled to the system by means of a sleeve member 12, welded to the duct 13, in which the pressure therein is to be measured. Advantageously, the sleeve member 12 is provided with an end tapering portion 14 effective to prevent said sleeve member from disengaging from the duct thereon it is to be welded, during the welding step.

The upper body 1 is provided, at the threaded coupling member 4, with a duct 15 thereon a needle valve 16 acts, provided with a tightness ring member 17, effective to allow for the flow in the measuring duct to be manually adjusted, said measuring duct 18 being provided with a graduated scale affording the possibility of visually monitoring the adjusted air amount.

More specifically, said measuring duct 18 communicates, through a joining duct 19, with a further duct 20 which latter perpendicularly extends and communicates in turn with the coupling member 21, coupled to a measuring instrument 22. The duct 19 leads to an interspace 23, as defined between the upper body 1 and the lower body 2 and sealed by means of a sealing ring member 24.

The interspace 23 communicates, through an extension duct 25, with the inner side of a membrane 26, of round cross-section, which, with the other side thereon, contacts the pressurized fluid the pressure thereon is to be measured. The membrane 26 is pressed and firmly affixed at the annular rim thereof, by screwing on a ring nut 27, associated with the threaded end of the lower body 2. The coupling between the ring nut 27 and lower body 2 is sealed by means of a tightness or sealing ring member 28.

Said ring nut 27 is tightly housed in said sleeve member 12 through a sealing ring member 29, as provided in an annular groove 30 defined on the ring nut, 27.

The upper body 1 is held in its position inside said sleeve member 12 by means of one or more stop screws 31, passing through the threading formed in the sleeve 12 and held captive in suitable recesses 32 as defined on the lower body 2. The membrane 26, subjected to the operating pressure, is effective to act, as it is deformed, as a shut off member for a duct 33, the inlet mouth whereof is located near to the inner surface of said membrane and the discharging port or outlet whereof consists of a hole 34, formed on the body 2.

The operation of the thereinabove illustrated device is very simple.

In fact, the pressurized air is introduced through the needle valve 16, which affords the possibility of calibrating the duct and equilibrate, by the pressure acting on the wall, the operating pressure of the fluid acting on the opposite wall or side of said membrane 26.

As the system pressure increases, the membrane 26, which is deformed by the pressure differential, closes by adhesion thereby shutting off the flow through the pressurized air discharging duct 33.

That closing up of the membrane causes the pressure in the pressurized air circuit to increase and an increasing of the value indicated by the measuring instrument 22, corresponding to the increasing of the process fluid operating pressure.

In the case therein the pressure of the process fluid decreases, the discharging duct is opened in a greater degree and the air inflow causes the circuit pressure to be reduced, as signalled by the measuring instrument 22.

The above illustrated operations occur with the pressurized air separated from the process fluid, thereby the latter can not be contaminated; moreover there is also excluded the possibility of penetration by any fluid in the measuring circuit elements.

Another important feature of the present invention is that the use of two screws 11 for coupling the upper body 1 to the lower body 2 affords the possibility of obtaining easily the proper vertical position or arrangement of the measuring duct 18.

The invention as disclosed is susceptible to many variations and modifications, all of which falling within the scope thereof.

Moreover, all of the details may be replaced by other technically equivalent elements.

In practicing the invention the used materials, though they are compatible to the intended application, as well as the contingent shapes and size may be any according to the needs.

I claim:

1. A device for measuring pressure and pressure variations of a pressurized fluid flowing through a duct (13), which device comprises an upper body and a lower body, coupled to one another by means of locking screws, said lower body being tightly connected by means of a resilient ring member, with a sleeve member welded on said duct, the upper body being coupled to a pressurized air source through a threaded coupling member, a graduated scale duct, associated with said upper body and communicating with a needle valve, said valve allowing for the air inflow into said duct to be manually adjusted, a coupling duct leading to an interspace defined between said lower and upper bodies and communicating with a diaphragm associated with said lower body, a pressure detecting instrument coupled with said graduated scale duct.

2. A device according to claim 1, wherein said diaphragm has a lower surface, said lower body forms a discharging duct (33), said diaphragm, as it is subjected to the pressure in said duct (13), acts as a shut off member of said discharging duct (33) formed in said lower body, said discharging duct being located near said lower surface of said diaphragm.

3. A device according to claim 1, wherein said sleeve member is a sleeve and said upper and lower bodies coupled by said locking screws are rotatable within said sleeve, whereby the position of said graduated scale duct is adjustable.

4. A device according to claim 1, wherein said sleeve is of tapered configuration at one end thereof.

* * * * *